(12) United States Patent
de Leon et al.

(10) Patent No.: US 12,391,553 B2
(45) Date of Patent: Aug. 19, 2025

(54) SYNTHETIC ENGINEERED DIAMOND MATERIALS WITH SPIN IMPURITIES AND METHODS OF MAKING THE SAME

(71) Applicants: The Trustees of Princeton University, Princeton, NJ (US); Element Six Technologies Limited, Oxfordshire (GB)

(72) Inventors: Nathalie de Leon, Princeton, NJ (US); Brendon C. Rose, Princeton, NJ (US); Ding Huang, Jersey City, NJ (US); Zi-Huai Zhang, Princeton, NJ (US); Alexei M. Tyryshkin, Yardley, PA (US); Sorawis Sangtawesin, Bangkok (TH); Srikanth Srinivasan, Princeton, NJ (US); Matthew Lee Markham, Cholsey (GB); Andrew Mark Edmonds, Didcot (GB); Daniel J. Twitchen, Bucks (GB); Stephen A. Lyon, Princeton, NJ (US)

(73) Assignees: The Trustees of Princeton University, Princeton, NJ (US); Element Six Technologies Limited, Oxfordshire (GB)

( * ) Notice: Subject to any disclaimer, the term of this patent is extended or adjusted under 35 U.S.C. 154(b) by 1555 days.

(21) Appl. No.: 16/648,076

(22) PCT Filed: Sep. 18, 2018

(86) PCT No.: PCT/US2018/051482
§ 371 (c)(1),
(2) Date: Mar. 17, 2020

(87) PCT Pub. No.: WO2019/055975
PCT Pub. Date: Mar. 21, 2019

(65) Prior Publication Data
US 2020/0277196 A1   Sep. 3, 2020

Related U.S. Application Data

(60) Provisional application No. 62/559,918, filed on Sep. 18, 2017.

(51) Int. Cl.
*C01B 32/28* (2017.01)
*C09K 11/59* (2006.01)
*B82Y 20/00* (2011.01)

(52) U.S. Cl.
CPC .............. *C01B 32/28* (2017.08); *C09K 11/59* (2013.01); *B82Y 20/00* (2013.01); *C01P 2006/60* (2013.01)

(58) Field of Classification Search
None
See application file for complete search history.

(56) References Cited

U.S. PATENT DOCUMENTS

| 2010/0015438 A1 | 1/2010 | Booth et al. |
| 2013/0175546 A1 | 7/2013 | Khan |

(Continued)

FOREIGN PATENT DOCUMENTS

| JP | 2008543718 A | 12/2008 |
| JP | 2016505494 A | 2/2016 |

(Continued)

OTHER PUBLICATIONS

Newton et al.; Physical Review B 84, 245208; 2011.*

(Continued)

*Primary Examiner* — Guinever S Gregorio
(74) *Attorney, Agent, or Firm* — Armstrong Teasdale LLP

(57) ABSTRACT

Disclosed are synthetic diamond materials for quantum and optical applications, such as quantum information process- (Continued)

ing, quantum key distribution, quantum repeaters, and quantum sensing devices, based on spin defects in diamond. This includes methods for synthesizing and treating diamond in order to create spin defects with improved spin coherence and optical emission properties, as well as treating the diamond to eliminate unwanted defects that degrade these properties.

7 Claims, 9 Drawing Sheets

(56) References Cited

U.S. PATENT DOCUMENTS

| | | | |
|---|---|---|---|
| 2015/0299894 A1* | 10/2015 | Markham | C30B 29/04 423/446 |
| 2017/0020419 A1 | 1/2017 | Acosta et al. | |
| 2018/0187333 A1 | 7/2018 | Booth et al. | |

FOREIGN PATENT DOCUMENTS

| | | |
|---|---|---|
| JP | 2016537287 A | 12/2016 |
| WO | 2017136015 A2 | 8/2017 |

OTHER PUBLICATIONS

Rose et al. "Observation of an environmentally insensitive solid-state spin defect in diamond", Science 361, 60-63 (2018) Jul. 6, 2018.
Green et al. "The neutral silicon-vacancy center in diamond: spin polarization and lifetimes", arXiv:1705.10205v1 May 29, 2017.
G. Balasubramanian et al., "Ultralong spin coherence time in isotopically engineered diamond", Nat. Mater. 8, 383-387 (2009).
E. Togan et al., "Quantum entanglement between an optical photon and a solid-state spin qubit.", Nature. 466, 730-734 (2010).
P. C. Maurer et al., "Room-Temperature Quantum Bit Memory Exceeding One Second.", Science. 336, 1283-1286 (2012).
F. Dolde et al., "Room-temperature entanglement between single defect spins in diamond." Nat. Phys. 9, 139-143 (2013).
W. Pfaff et al., "Unconditional quantum teleportation between distant solid-state qubits." Science. 345, 532-535 (2014).
H. Bernien et al., "Two-Photon Quantum Interference from Separate Nitrogen Vacancy Centers in Diamond." Phys. Rev. Lett. 108, 43604 (2012).
B. Hensen et al., "Loophole-free Bell inequality violation using electron spins separated by 1.3 kilometres.", Nature. 526, 682-686 (2015).
H. Bernien et al., "Heralded entanglement between solid-state qubits separated by three metres." Nature. 497, 86-90 (2013).
N. Kalb et al., "Entanglement distillation between solid-state quantum network nodes", Science 356, 928-932 (2017) Jun. 2, 2017.
P. E. Barclay, K.-M. C. Fu, C. Santori, A. Faraon, R. G. Beausoleil, "Hybrid Nanocavity Resonant Enhancement of Color Center Emission in Diamond." Phys. Rev. X. 1, 11007 (2011).
P. Olivero et al., "Splitting of photoluminescent emission from nitrogen-vacancy centers in diamond induced by ion-damage-induced stress." New J. Phys. 15, 43027 (2013).
J. Wolters, N. Sadzak, A. W. Schell, T. Schroder, O. Benson, "Measurement of the Ultrafast Spectral Diffusion of the Optical Transition of Nitrogen Vacancy Centers in Nano-Size Diamond Using Correlation Interferometry." Phys. Rev. Lett. 110, 27401 (2013).
Y. Chu et al., "Coherent Optical Transitions in Implanted Nitrogen Vacancy Centers." Nano Lett. 14, 1982-1986 (2014).
A. Dietrich et al., "Isotopically varying spectral features of silicon-vacancy in diamond." New J. Phys. 16 (2014).
L. J. Rogers et al., "All-Optical Initialization, Readout, and Coherent Preparation of Single Silicon-Vacancy Spins in Diamond." Phys. Rev. Lett. 113, 263602 (2014).
A. Sipahigil et al., "Indistinguishable Photons from Separated Silicon-Vacancy Centers in Diamond." Phys. Rev. Lett. 113, 113602 (2014).
A. Sipahigil et al., "An integrated diamond nanophotonics platform for quantum-optical networks." Science. 354, 847-850 (2016).
K. D. Jahnke, et. al., "Electron-phonon processes of the silicon-vacancy centre in diamond." New J. Phys. 17 (2015).
A. Gali, M. Fyta, E. Kaxiras, "Ab initio supercell calculations on nitrogen-vacancy center in diamond: Electronic structure and hyperfine tensors." Phys. Rev. B. 77, 155206 (2008).
J. R. Maze et al., "Properties of nitrogen-vacancy centers in diamond: The group theoretic approach." New J. Phys. 13, 1-30 (2011).
A. M. Edmonds, M. E. Newton, P. M. Martineau, D. J. Twitchen, S. D. Williams, "Electron paramagnetic resonance studies of silicon-related defects in diamond." Phys. Rev. B. 77, 1-11 (2008).
U. F. S. D'Haenens-Johansson et al., "Optical properties of the neutral silicon split-vacancy center in diamond." Phys. Rev. B 84, 1-14 (2011).
J. Goss, R. Jones, S. Breuer, P. Briddon, S. Oberg, "The Twelve-Line 1.682 eV Luminescence Center in Diamond and the Vacancy-Silicon Complex." Phys. Rev. Lett. 77, 3041-3044 (1996).
A. Gali, J. R. Maze, "Ab initio study of the split silicon-vacancy defect in diamond: Electronic structure and related properties." Phys. Rev. B. 88, 235205 (2013).
A. T. Collins, "The Fermi level in diamond." J. Phys. Condens. Matter. 14, 3743-3750 (2002).
A. Jarmola, V. M. Acosta, K. Jensen, S. Chemerisov, D. Budker, "Temperature- and Magnetic-Field-Dependent Longitudinal Spin Relaxation in Nitrogen-Vacancy Ensembles in Diamond." Phys. Rev. Lett. 108, 197601 (2012).
W. B. Mims, K. Nassau, J. D. McGee, "Spectral diffusion in electron resonance lines." Phys. Rev. 123, 2059-2069 (1961).
P. L. Stanwix et al., "Coherence of nitrogen-vacancy electronic spin ensembles in diamond." Phys. Rev. B. 82, 201201 (2010).
B. C. Rose, C. D. Weis, A. M. Tyryshkin, T. Schenkel, S. A. Lyon, "Spin coherence and 14N ESEEM effects of nitrogen-vacancy centers in diamond with X-band pulsed ESR." Diam. Relat. Mater. 72, 32-40 (2017).
S. Meiboom, D. Gill, "Modified Spin—Echo Method for Measuring Nuclear Relaxation Times." Rev. Sci. Instrum. 29, 688-691 (1958).
E. Neu et al., "Single photon emission from silicon-vacancy colour centres in chemical vapour deposition nano-diamonds on iridium." New J. Phys. 13 (2011).
E. Neu, M. Fischer, S. Gsell, M. Schreck, C. Becher, "Fluorescence and polarization spectroscopy of single silicon vacancy centers in heteroepitaxial nanodiamonds on iridium." Phys. Rev. B. 84, 205211 (2011).
D. M. Toyli, C. D. Weis, G. D. Fuchs, T. Schenkel, D. D. Awschalom, "Chip-Scale Nanofabrication of Single Spins and Spin Arrays in Diamond." Nano Lett. 10, 3168-3172 (2010).
D. Englund et al., "Controlling the Spontaneous Emission Rate of Single Quantum Dots in a Two-Dimensional Photonic Crystal." Phys. Rev. Lett. 95, 13904 (2005).
Q. Li, M. Davanco, Srinivasan Kartik, "Efficient and low-noise single-photon-level frequency conversion interfaces using silicon nanophotonics." Nature 10, 406-414 (2016).
T. Iwasaki et al., "Germanium-Vacancy Single Color Centers in Diamond." Sci. Rep. 5, 12882 (2015).
A. M. Tyryshkin et al., "Electron spin coherence exceeding seconds in high purity silicon." Nat. Mater. 11, 18 (2011).
International Search Report and Written Opinion for PCR/US2018/051482, dated Mar. 7, 2019.

* cited by examiner

SYNTHETIC ENGINEERED DIAMOND MATERIALS WITH SPIN IMPURITIES AND METHODS OF MAKING THE SAME

CROSS-REFERENCE TO RELATED APPLICATIONS

This application claims priority to U.S. Provisional Application No. 62/559,918, filed Sep. 18, 2017, which is herein incorporated by reference in its entirety.

STATEMENT REGARDING FEDERALLY SPONSORED RESEARCH OR DEVELOPMENT

This invention was made with government support under Grant Nos. DMR-1420541 and 1640959 awarded by the National Science Foundation. The government has certain rights in the invention.

TECHNICAL FIELD

This relates generally to synthetic diamond materials, and more particularly, to synthesizing and treating diamond in order to create spin defects with improved spin coherence and optical emission properties.

BACKGROUND

Point defects in diamond known as color centers are a promising physical platform for quantum science and quantum information processing. They are particularly promising candidates for single atom quantum memories to enable quantum networks and long distance quantum communication. As atom-like systems, they can exhibit excellent spin coherence and can be manipulated with light. As solid-state defects, they can be placed together at high densities and incorporated into scalable devices. Diamond is a uniquely excellent host: it has a large bandgap, can be synthesized with sub-ppb impurity concentrations, and can be isotopically purified to eliminate magnetic noise from nuclear spins. (G. Balasubramanian et al., Ultralong spin coherence time in isotopically engineered diamond. Nat. Mater. 8, 383-387 (2009).)

The well-studied negatively charged nitrogen vacancy ($NV^-$) center exhibits long electron spin coherence times even at room temperature, and has been used to demonstrate basic building blocks of quantum networks. However, the $NV^-$ center suffers from a low spin-photon entanglement generation rate that is limited by its optical properties. In particular, only a small fraction of $NV^-$ emission is at the zero-phonon line (ZPL). Furthermore, $NV^-$ exhibits a large static inhomogeneous linewidth (P. Olivero et al., Splitting of photoluminescent emission from nitrogen-vacancy centers in diamond induced by ion-damage-induced stress. New J. Phys. 15, 43027 (2013)) and significant spectral diffusion (J. Wolters, N. Sadzak, A. W. Schell, T. Schroder, O. Benson, Measurement of the Ultrafast Spectral Diffusion of the Optical Transition of Nitrogen Vacancy Centers in Nano-Size Diamond Using Correlation Interferometry. Phys. Rev. Lett. 110, 27401 (2013)), particularly when placed near surfaces (Y. Chu et al., Coherent Optical Transitions in Implanted Nitrogen Vacancy Centers. Nano Lett. 14, 1982-1986 (2014)), which result from a large difference in the permanent electric dipole moment between the ground and excited states. These optical properties severely limit the utility of $NV^-$ centers for future scalable technologies.

Recently, the negatively charged silicon vacancy ($SiV^-$) center has been demonstrated to have more favorable optical properties. However, orbital relaxation through electron-phonon coupling limits the $SiV^-$ electron spin coherence time ($T_2$) to 38 ns, even at cryogenic temperatures (T=4.5 K). (L. J. Rogers et al., All-Optical Initialization, Readout, and Coherent Preparation of Single Silicon-Vacancy Spins in Diamond. Phys. Rev. Lett. 113, 263602 (2014).) This results from its imbalanced electronic spin configuration, with total spin S=½ in doubly degenerate orbitals, making $SiV^-$ prone to phonon-mediated, dynamic Jahn-Teller-like orbital relaxation. (K. D. Jahnke, et. al., Electron-phonon processes of the silicon-vacancy centre in diamond. New J. Phys. 17 (2015).)

Thus, a technology combining the attractive optical properties of $SiV^-$ with the long spin coherence time of $NV^-$ is needed and desirable.

BRIEF SUMMARY

The present invention is drawn to a composition of matter that combines the attractive optical properties of $SiV^-$ with the long spin coherence time of $NV^-$, and a means for creating that composition.

Disclosed is a diamond lattice containing carbon and neutral silicon vacancy centers ($SiV^0$), where the material displays a photoluminescence emission peak arising from the $SiV^0$ around 946 nm and where a zero phonon line for a $SiV^0$ has a full width half maximum (FWHM) intrinsic inhomogeneous zero phonon line width of no more than 500 MHz over a time scale of at least 1 hour. Advantageously, the $SiV^0$ is no more than 1 micron from a surface. The composition may also include acceptor atoms, and boron specifically, in the lattice. The composition may also include $^{28}Si$ and have a total concentration of silicon in the lattice less than or equal to 1 ppm, and where the ratio of $SiV^0$ to $^{28}Si$ is at least 4:1.

Further, a $SiV^0$ may have an optical linewidth between about 2 and about 6 times the transform limited linewidth determined by the bulk photoluminescence excited state lifetime limit.

Additionally, the $SiV^0$ may have an electron spin coherence time of between about 0.5 milliseconds and about 500 milliseconds and/or a spin relaxation time of between about 20 seconds and about 120 seconds when below 20 K.

The composition of matter of claim 1, wherein the zero phonon line for a neutral silicon vacancy center has a full width half maximum intrinsic inhomogeneous zero phonon line width selected from any of no more than 250 MHz and no more than 100 MHz.

Also disclosed is a method for producing diamond comprising a plurality of neutral silicon vacancy centers. The method includes providing a diamond comprising low concentrations of acceptor atoms and silicon and annealing the diamond at a first temperature. Advantageously, the acceptor atoms include boron. The diamond may also comprise no more than 50 ppb of neutral uncompensated nitrogen. The method may also include implanting or doping the acceptor atoms, the silicon, or both, in the diamond. The annealing may be performed in a vacuum.

The method may also include annealing the diamond at a second temperature, where the second temperature is greater than the first temperature, and annealing the diamond at a third temperature, where the third temperature is greater than the second temperature. Advantageously, the first temperature is between 350° C. and 450° C., the second temperature is between 600 and 900° C., and the third temperature is no less than 1100° C.

The method may also include synthesizing the diamond via microwave plasma enhanced chemical vapor deposition, which may also include doping the diamond during synthesis with an acceptor atom concentration of between 0.1 ppm and 2 ppm.

Also disclosed is a method for producing synthetic diamond material comprising a plurality of neutral silicon vacancy centers which involves providing a high pressure, high temperature substrate and process feedstocks, which include a carbon feedstock, an acceptor atom feedstock, and a silicon feedstock. A synthetic diamond material is then grown via microwave plasma-enhanced chemical vapor deposition. The process feedstocks are chosen or controlled such that the synthetic diamond material comprises less than or equal to 3 ppm of acceptor atoms, and less than or equal to 1 ppm of silicon.

DETAILED DESCRIPTION

Figure 1:
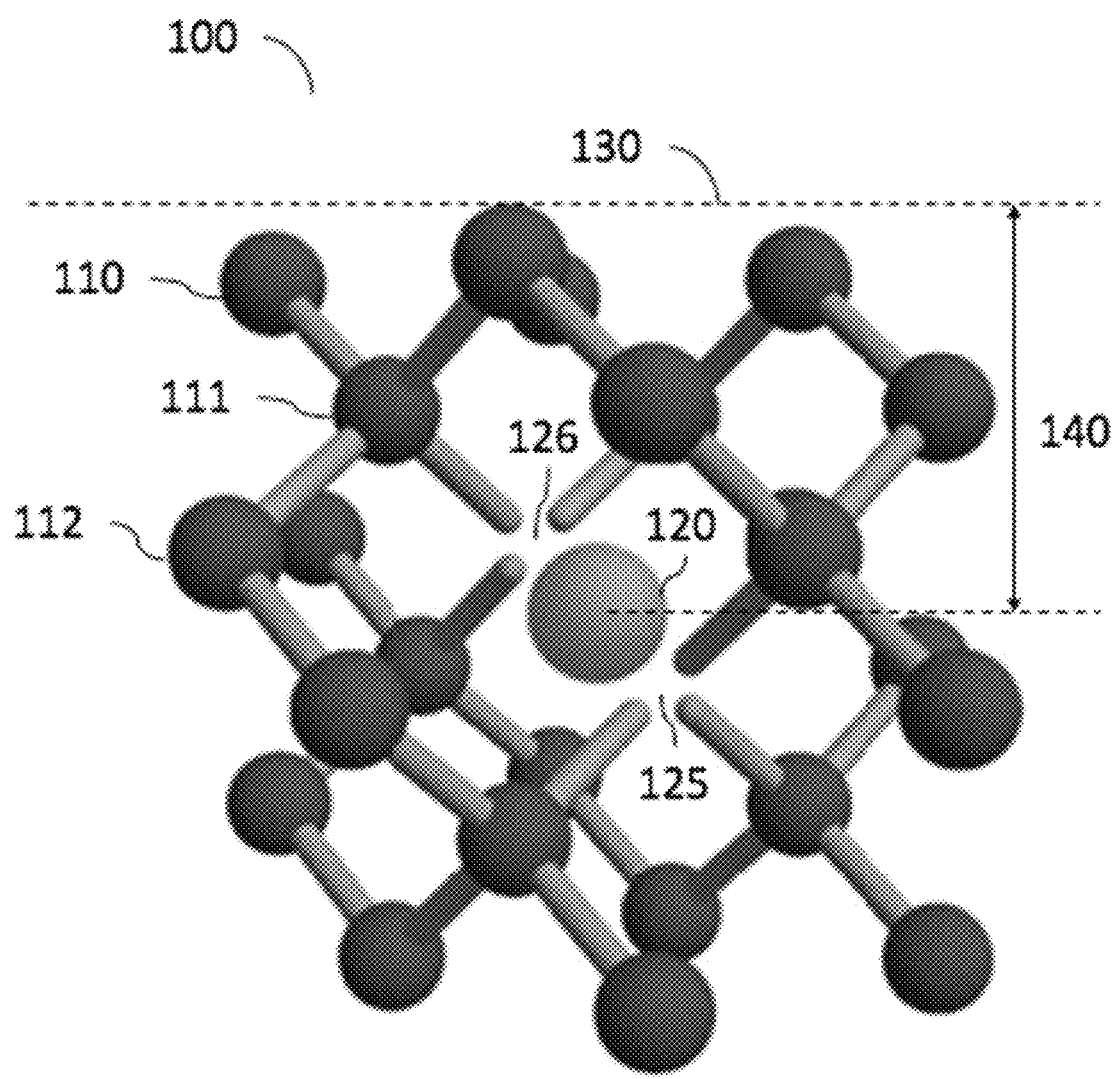
FIG. 1 is a ball and stick model of a silicon split-vacancy defect center in diamond.

Disclosed are synthetic engineered diamond materials for quantum and optical applications with spin impurities and methods of making the same. More particularly, disclosed is a process for stabilizing a new charge state of a known color center, the neutral silicon vacancy center (SiV$^0$) in diamond, with high efficiency. Also disclosed is a new material, in that it contains a high percentage of SiV$^0$, which has not been previously engineered or observed.

The disclosed new color center has long spin coherence times at cryogenic temperatures, and especially at temperatures less than, e.g., 20 K, as well as narrow optical linewidths, making it an attractive candidate for quantum information processing. There are many possible applications, including quantum communication, quantum simulation and computing, and nanoscale or quantum sensing.

The color center that is currently the most studied is the nitrogen vacancy (NV$^-$) center, which has been commercially deployed in magnetometers and sensors. However, its application to quantum communication is hampered by instability of its optical transition frequency in time—so called "spectral diffusion." This new defect in diamond, SiV$^0$, has the same spin coherence as NV$^-$, but exhibits far less spectral diffusion.

Reference is now made in detail to the description of the invention as illustrated in the drawings. While the invention will be described in connection with these drawings, there is no intent to limit it to the embodiment or embodiments disclosed therein.

Unless defined otherwise above, all technical and scientific terms used herein have the same meaning as commonly understood by one of ordinary skill in the art to which this invention belongs. Where a term is provided in the singular, the inventor also contemplates the plural of that term. The nomenclature used herein, and the procedures described below are those well-known and commonly employed in the art.

The singular forms "a", "an", and "the" as used herein include plural references unless the context clearly dictates otherwise.

The terms "comprise" and "comprising" as used herein is used in the inclusive, open sense, meaning that additional elements may be included.

Referring to FIG. 1, the disclosed composition (100) generally involves carbon in a diamond lattice (110, 111, 112). The lattice also contains at least one neutral silicon vacancy center (SiV$^0$) (120). As shown in FIG. 1, a silicon vacancy center exists where two neighboring carbon atoms in the lattice are replaced with one silicon atom, where the one silicon atom (120) is located between the two vacant lattice sites (125, 126).

Figure 2:
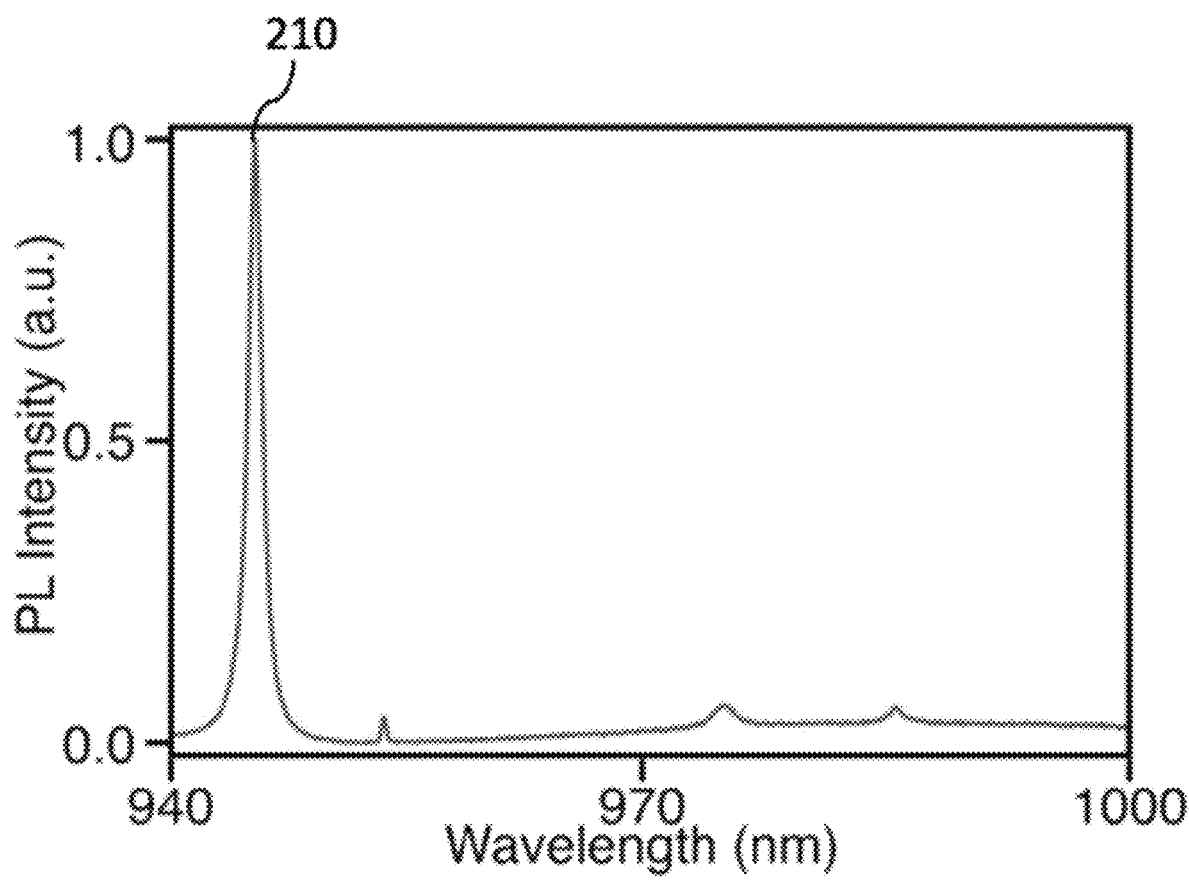
FIG. 2 is a graph of a bulk PL spectrum of one embodiment, where SiV$^0$ at 77 K shows a zero-phonon line at 946 nm.

Referring to FIG. 2, the disclosed composition displays a photoluminescence (PL) emission peak (210) arising from the neutral silicon vacancy centers around 946 nm.

Figure 3:
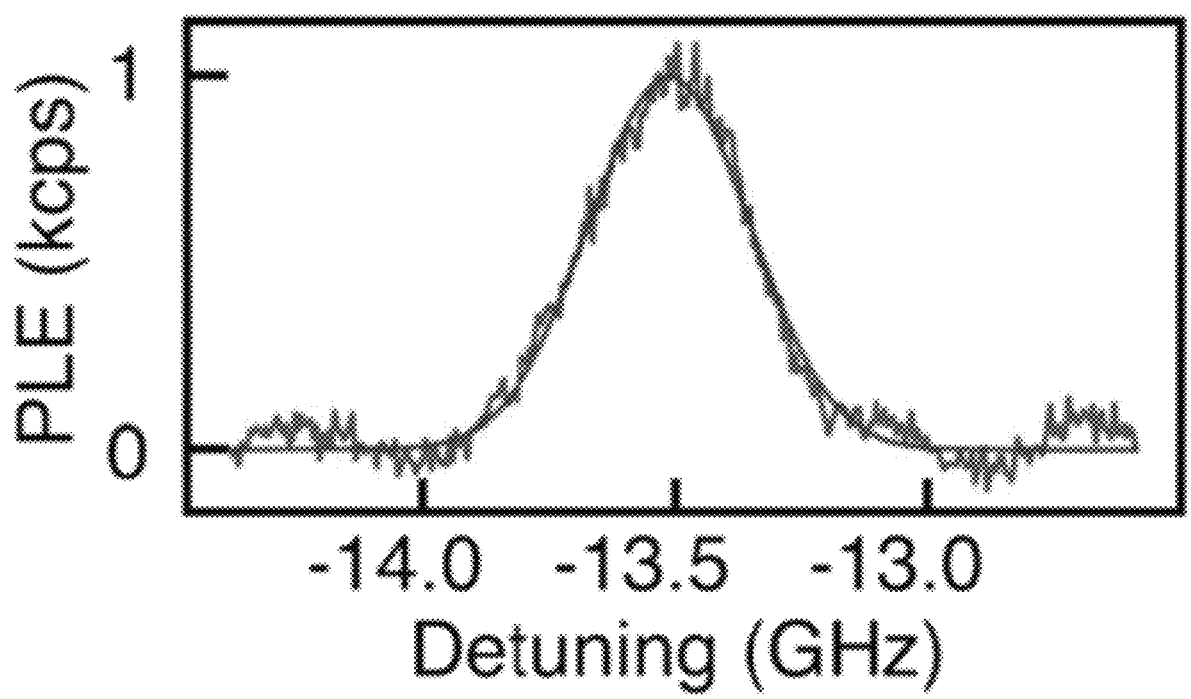
FIG. 3 is a graph of a gaussian fit to a single isolated optical peak of one embodiment, averaged across multiple scans.

Referring to FIG. 3, these compositions also have a zero phonon line for a neutral silicon vacancy center has a full width half maximum intrinsic inhomogeneous zero phonon line width of no more than 500 MHz over a time scale of, e.g., at least 1 hour at temperatures of 40 K or below. For FIG. 3, a laser was scanned over a 50 GHz range around 946 nm while detecting emissions into the sideband (>960 nm). The scan showed multiple lines that were stable across 80 iterations spanning a 3-hour period. FIG. 3 shows a gaussian fit to a single isolated peak, averaged across all 80 scans, with a full width at half maximum (FWHM) of 360 MHz. Other embodiments provide a FWHM of no more than 500 MHz, preferably no more than 250 MHz, and still more preferably no more than 100 MHz, over various periods of time, including, e.g., at least 1 ms, at least 10 ms, at least 100 ms, at least 1 s, at least 1 min, and at least 1 hour. More preferably the period of time is at least 2 hours, and still more preferably at least 3 hours.

In some embodiments, these linewidths may be multiple factors wider than the transform limited linewidth determined by the bulk PL excited state lifetime. For example, in one embodiment, the excited state lifetime ($\tau$) was determined to be 1.8 ns, which provides a transform limited linewidth of 88 MHz ($1/2\pi\tau$). Linewidths preferably range from 1 to 20 times wider than the transform limited linewidth, more preferably from 1 to 12 times, more still preferably from 1 to 7 times, and even more preferably from 2 to 6 times.

Referring back to FIG. 1, in some embodiments, at least one SiV$^0$ is within a limited distance (140) from a surface (130). In some embodiments, the distance (140) is no more than 1000 nm, preferably no more than 500 nm, more preferably no more than 200 nm, still more preferably no more than 100 nm, even more preferably no more than 50 nm, still more preferably no more than 30 nm, still more preferably no more than 10 nm, and most preferably no more than 5 nm from a surface (130).

The lattice may also include acceptor atoms or dopants at a concentration of less than 4 ppm, more preferably less than 3 ppm, and still more preferably less than 2 ppm, and even more preferably less than or equal to 1 ppm. Preferably, the acceptor atoms, if present, are present at a concentration of at least 0.1 ppm, and more preferably at least 0.5 ppm. Typically, the acceptor atoms are doped into the diamond lattice, where an acceptor atom will replace a carbon atom in the lattice structure. Although any acceptor atom is contemplated, typically boron is used as a dopant.

Note that other impurities may also exist in the diamond lattice, although preferably, they are at low levels. For example, in some embodiments, nitrogen is present in the lattice, at a concentration of less than 50 ppb, preferably less than 10 ppb, more preferably less than 5 ppb, and still more preferably less than 1 ppb. Further, the lattice may include defects, such as single vacancies and divacancies. Typically the lattice will include less than 1.5 ppb, preferably less than 1 ppb, and still more preferably less than 0.75 ppb single vacancies and divacancies.

The lattice may include a total silicon concentration of less than or equal to 2 ppm, preferably less than or equal to 1 ppm, and more preferably less than or equal to 0.5 ppm. During a processing step, a percentage of implanted silicon (e.g., $^{28}Si$)) is converted to $SiV^0$. In some embodiments, the conversion rate to $SiV^0$ is at least 75%, more preferably at least 80%, and still more preferably at least 85%. In some embodiments, the ratio of neutral silicon vacancy centers ($SiV^0$) to silicon is at least 3:1, preferably at least 4:1, and more preferably is at 5:1.

Figure 5A:
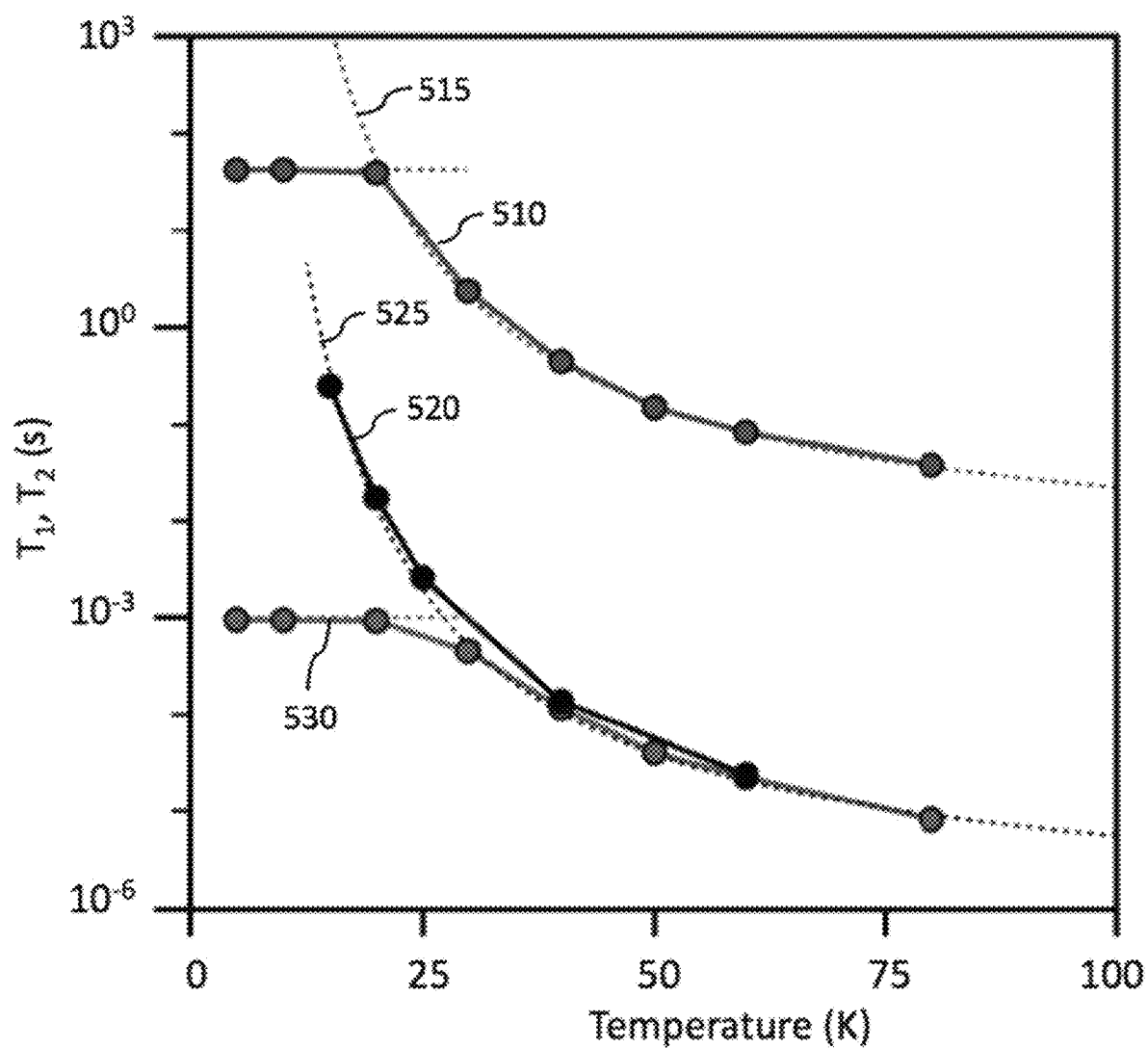
FIG. 5A is a graph illustrating spin relaxation time ($T_1$) and coherence time ($T_2$) measurements.

FIG. 5A illustrates temperature dependence of spin relaxation time ($T_1$) and coherence time ($T_2$, $T_{2,CPMG}$) measurements for some embodiments. In FIG. 5A, the Temperature dependence of $T_1$ (510), $T_2$ (520), and $T_{2,CPMG}$ (530) are shown for $SiV^0$ measured on the $m_s=0 \leftrightarrow +1$ transition of a site aligned with the magnetic field. As seen, below 20 K both $T_1$ and $T_2$ are independent of temperature, with $T_1=43\pm 2$ s and $T_2=0.954\pm 0.025$ ms. Above 20 K both $T_1$ and $T_2$ show a temperature dependence consistent with an Orbach process with an activation energy of 16.8 meV (dashed lines 515, 525). Dynamical decoupling with CPMG (530) extends the coherence time to $T_{2,CPMG}=255\pm 20$ ms at 15 K. The range of electron spin coherence times is not limited to any particular range, although it is typically greater than 0.1 milliseconds, preferably between 0.1 milliseconds and 1 second, more preferably between 0.5 milliseconds and 500 milliseconds, and even more preferably between 0.9 milliseconds and 300 milliseconds when below 20 K. Similarly, the range of spin relaxation times is not limited to any particular range, although it is typically greater than 1 second, preferably between 1 second and 500 seconds, more preferably between 20 seconds and 120 seconds, and even more preferably between 25 seconds and 86 seconds when below 20 K.

The temperature dependence observed for the 946 nm $SiV^0$ ZPL photoluminescence is consistent with phonon broadening as temperature is increased. This broadening effect saturates at lower temperature, which is inconsistent with previous reports which showed the overall intensity decreasing with decreasing temperature in the range 5 K to 100 K. This discrepancy is likely a result of composition variation among samples, and highlights the advantages of engineering samples with the desired color center rather than relying on unique samples with unknown composition. The excited state lifetime is independent of temperature within the range of the measurements, 5 K to 40 K.

Figure 6A:
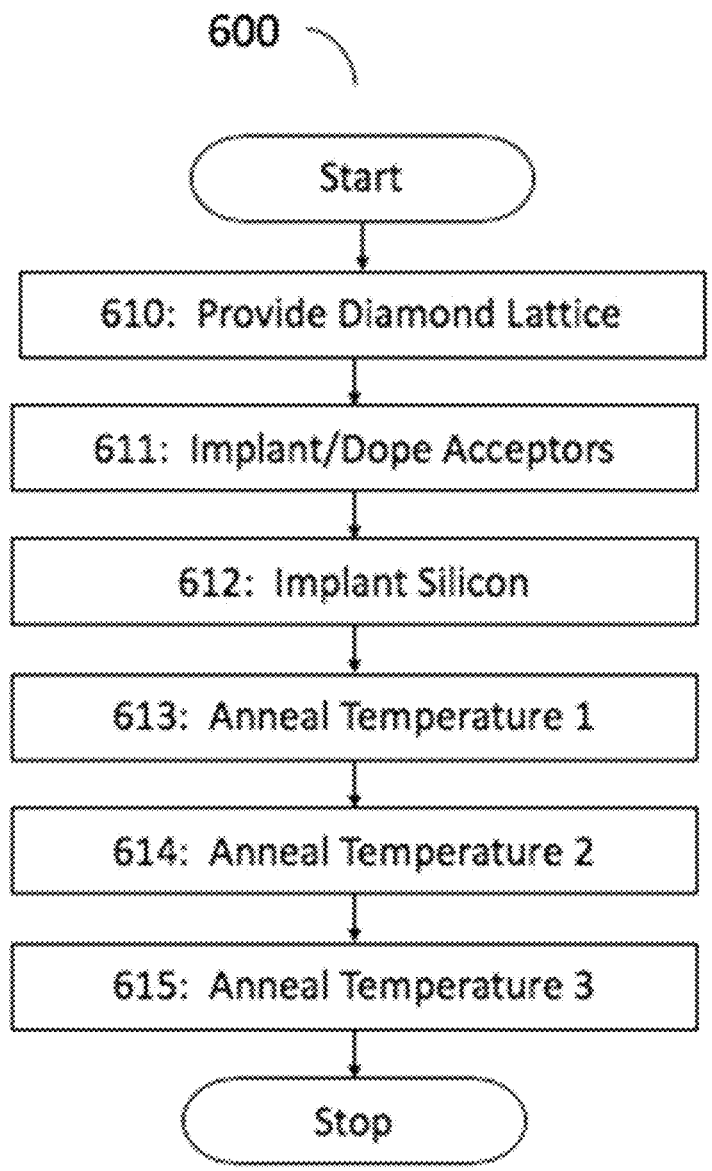
FIGS. 6A and 6B are flowcharts of embodiments of methods for producing diamond comprising a plurality of neutral silicon vacancy centers.

To create these compositions of matter, a method for stabilizing a charge state of a neutral silicon vacancy center in diamond with high efficiency is needed. FIG. 6A provides a flowchart of such a method, which generally involves (1) providing a particular diamond lattice, and then (2) annealing. The method (600) begins by providing the diamond lattice (610) to be annealed. As described above, the diamond lattice may already be doped with acceptor atoms at a concentration of less than or equal to, e.g., 3 ppm, and may contain less than or equal to, e.g., 50 ppb of nitrogen and/or less than or equal to, e.g., 1 ppb of single vacancies and divacancies. In preferred embodiments, the acceptor atoms include boron, and the diamond comprises no more than 50 ppb of neutral uncompensated nitrogen. Further, the diamond lattice should contain silicon at a concentration of less or equal to, e.g., 1 ppm.

In some embodiments of the method, the diamond is provided by synthesizing the diamond, e.g., via microwave plasma enhanced chemical vapor deposition. In some embodiments, the diamond is doped during synthesis with an acceptor atom concentration of 0.1 ppm to 4 ppm, preferably from 0.1 to 3 ppm, more preferably from 0.1 to 2 ppm, and still more preferably from 0.5 to 2 ppm.

In some embodiments of the method where diamond is provided and the acceptor atoms are not already sufficiently present in the lattice, the method may optionally include implanting or doping the acceptor atoms (611) in the diamond. In some embodiments where the silicon is not already sufficiently present in the lattice, the method may optionally also include implanting or doping the silicon (612) in the diamond. Precise spatial control over the formation of $SiV^0$ by ion implantation can be addressed by implantation through a patterned mask.

After ion implantation, the diamond lattice may optionally be annealed at a first temperature (613). The first temperature is typically between 200° C. and 600° C., preferably between 300° C. and 500° C. and more preferably between 350° C. and 450° C.

When incorporating silicon atoms via ion implantation, the method will typically include annealing at a second temperature (614). The second temperature is greater than the first temperature, and typically is between 600° C. and 1000° C., preferably between 600° C. and 900° C., and more preferably between 700° C. and 900° C.

The method may then optionally proceed with annealing at a third temperature (615). The third temperature is greater than the second temperature, and typically is no less than 1100° C., and preferably between 1100° C. and 1300° C.

Any or all of these annealing steps may occur in a vacuum.

Figure 6B:
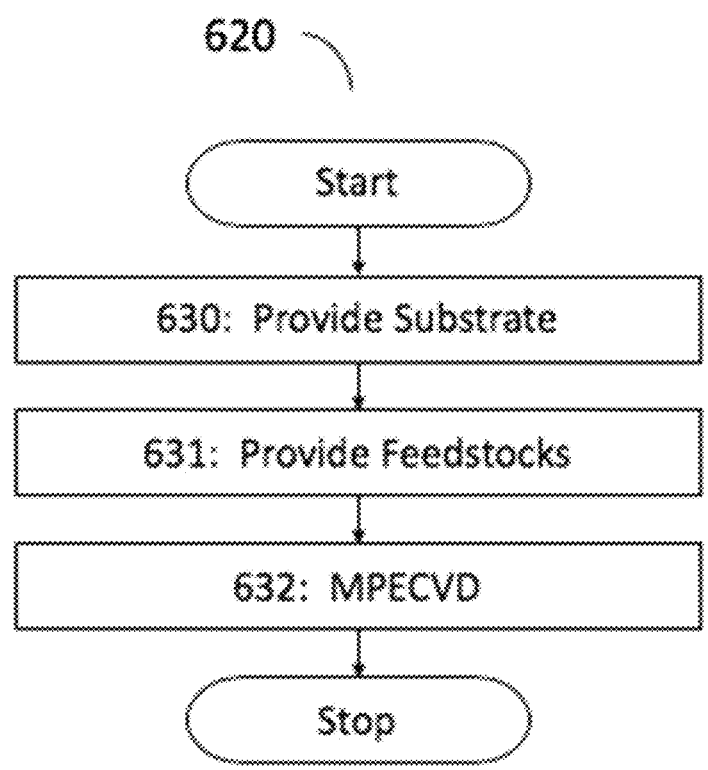

FIG. 6B provides a flowchart of another method for generating the disclosed synthetic diamond material. The method (620) begins by providing a single crystal diamond substrate (630) upon which the diamond material will be grown. Typically, this is a high-pressure, high temperature (HPHT) substrate or chemical vapor deposition (CVD) substrate, Various feedstocks are then provided (631), including a carbon feedstock, an acceptor atom feedstock, and a silicon feedstock. Other feedstocks, such as a source for nitrogen, may also be utilized. Then, via microwave plasma-enhanced chemical vapor deposition (MPECVD) the synthetic diamond material is grown (632). During MPECVD, by introducing microwaves into the feedstock gases, a plasma is generated in the vicinity of the substrate, and the feedstock gases are thereby grown on the substrate. During MPECVD, the feedrate of the feedstock into the plasma can be adjusted in order to control the configuration of the synthetic diamond material. During at least a portion of the growth, the feedrates should be controlled such that in at least a portion of the synthetic diamond material, the diamond comprises at least less than or equal to 3 ppm of acceptor atoms, and less than or equal to 1 ppm of silicon. The diamond may also contain less than or equal to, e.g., 50 ppb of nitrogen and/or less than or equal to, e.g., 1 ppb of single vacancies and divacancies. In preferred embodiments, the acceptor atoms include boron, and the diamond comprises no more than 50 ppb of neutral uncompensated nitrogen.

Example 1

A modulation doped diamond (layered sample) that allows a wide range of relative co-defect concentrations to be accessed in a single sample was created. This diamond was grown by microwave plasma-enhanced chemical vapor deposition on a high-pressure high-temperature substrate, and both the boron and silicon concentrations were ramped throughout the growth. The boron precursor was shut off to create a 200 μm low-boron ([B]<35 ppb) region in the middle of the sample. In this layered sample, emission at 946 nm in bulk PL was observed as well as the KUL1 center in bulk X-band (9.7 GHz) ESR.

Specifically, four sets of peaks were observed with the external magnetic field aligned along a <111> axis, consistent with the two inequivalent site orientations with splittings that correspond to S=1, D=942 MHz. Furthermore, the hyperfine structure of a single peak is consistent with prior measurements, and the single set of $^{13}C$ hyperfine peaks is indicative of the inversion symmetry of the center. From the PL and Hahn echo intensities compared to the known Si concentration in the sample, it was estimated that only a small fraction of the Si exists as $SiV^0$. In this example, the apparent optical and spin properties of $SiV^0$ in the layered sample were complicated by heterogeneity and the presence of co-defects. The PL spectrum shows broad emission to the red of 946 nm, as well as three peaks at 952, 975, and 985 nm, potentially associated with other defects. Time-resolved pulsed ESR measurements of this sample exhibit multi-exponential decays for both $T_1$ and $T_2$, most likely because of dipolar interactions between $SiV^0$ centers and interactions with uncontrolled co-defects.

Spatially-resolved PL mapping reveals that 946 nm emission is localized in specific bands in the layered sample, suggesting that $SiV^0$ may form more efficiently in certain environments. Correlating these regions with spatially-resolved secondary ion mass spectrometry (SIMS) indicates that $SiV^0$ formed in the regions where [B]=1-3 ppm, [Si]=400 ppb, and [N] below the detection limit of the technique, estimated to be around 1 ppb from prior characterization of growth conditions.

Combining PL mapping and SIMS allowed for the determination of the locations at which $SiV^0$ was most readily formed, correlated with the elemental compositions in those regions. In the SIMS analysis samples were taken in 8 second intervals and averaged by taking 10 samples at each position. After this averaging, the noise floor of the measurement was in the range of $5 \times 10^{15}$ cm$^{-3}$. This averaging was done at several points in 50 μm steps along a 1050 μm path length along the growth direction.

The initial points of the profile (from 0 to 300 μm) were taken in the HPHT region of the diamond (green region in FIG. 1B) which showed a low concentration of both silicon and boron, in the noise floor of the measurement. The CVD growth starts at 300 μm and continues until 1050 μm. During the CVD growth, both the boron and silicon precursors were ramped in concentration, this resulted in an exponential increase in the elemental concentrations of both silicon and boron in the diamond. The silicon concentration varies across the profile from $2 \times 10^{16}$ cm$^{-3}$ (0.1 ppm) to $2 \times 10^{17}$ cm$^{-3}$ (1 ppm). The boron concentration varies from $1 \times 10^{17}$ cm$^{-3}$ (0.5 ppm) to $4 \times 10^{17}$ cm$^{-3}$ (2 ppm), except for a 200 μm region in the middle of the growth where the boron precursor was suddenly switched off resulting in a boron concentration of $1 \times 10^{16}$ cm$^{-3}$ (0.1 ppm).

Example 2

Another diamond was doped during growth with boron ($1 \times 10^{17}$ cm$^{-3}$) and silicon (~$1 \times 10^{17}$ cm$^{-3}$) and subsequently HPHT annealed at 2000° C. resulting in a $SiV^0$ concentration of $4 \times 10^{16}$ cm$^{-3}$. The silicon precursor was isotopically enriched with 90% $^{29}Si$.

Example 3

A homogeneous sample with a uniform area distribution of $SiV^0$ was produced by implanting $^{28}Si$ into high purity diamond with [B]=1 ppm, [N]<5 ppb. Specifically, before ion implantation, boron was introduced into the diamond during the growth process with a concentration of $10^{17}$ cm$^{-3}$. 5-10 μm of diamond was etched to remove subsurface damage resulting from polishing. The surface of the diamond was strain-relief etched using an inductively coupled plasma reactive ion etcher (ICP-RIE, PlasmaTherm), first with Ar/$Cl_2$ chemistry followed by $O_2$. In order to optimize the bulk spin signal while avoiding dipolar interactions between spins, the implantation volume (depth) was maximized by multi-step implantation. The maximum implantation energy commercially available was 400 keV (Innovion), corresponding to a Si implantation depth of ~450 nm. As described below in Table 1, a total of seven implantation steps were used to generate a uniform distribution up to this maximum depth with a total fluence of [$^{28}Si$]=$3.0 \times 10^{11}$ cm$^{-2}$ and a volume density of ($7 \times 10^{15}$ cm$^{-3}$).

TABLE 1

Implantation Steps

| Step # | Dose (cm$^{-2}$) | Energy (keV) | Tilt (degrees) |
| --- | --- | --- | --- |
| 1 | 6.83E10 | 400 | 7 |
| 2 | 5.24E10 | 310 | 7 |
| 3 | 4.67E10 | 240 | 7 |
| 4 | 3.98E10 | 180 | 7 |
| 5 | 3.59E10 | 120 | 7 |
| 6 | 2.85E10 | 80 | 7 |
| 7 | 2.85E10 | 40 | 7 |

Figure 4:
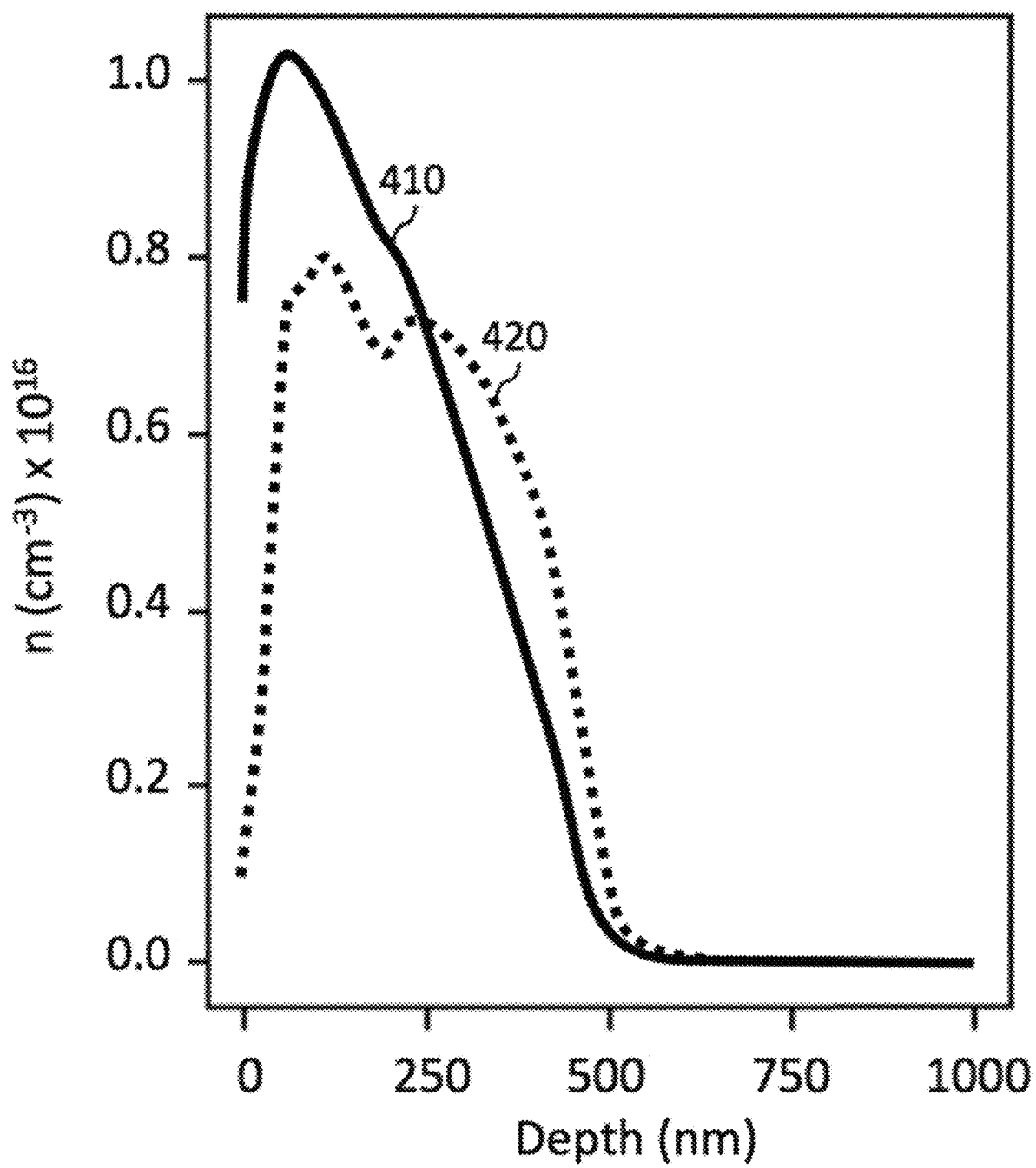
FIG. 4 is a graph illustrating the implantation profile of one embodiment.

The implantation profiles resulting from the steps referred to in Table 1 are shown in FIG. 4. The implantation profile of $^{28}Si$ (420) and damage-induced vacancies (410) are shown. As shown, substantially all of the $^{28}Si$ has been implanted to a maximum depth of 500 nm.

Vacancies from knock-on damage due to the implanted high energy $^{28}Si$ were simulated using the Stopping Range of Ions in Matter Monte Carlo simulation package (SRIM) and estimated to be ~$1 \times 10^{16}$ cm$^{-3}$. After implantation, high temperature vacuum annealing (<$10^{-6}$ Torr) was performed in three steps: 400° C. for 8 hours to move interstitial defects, 800° C. for 8 hours to form SiV, and 1200° C. for 2 hours to eliminate divacancies and multivacancies. The combined steps are useful for suppressing environmental noise and Fermi level pinning from lattice damage. Finally, refluxing in 1:1:1 concentrated sulfuric, perchloric, and nitric acids removed graphitic carbon formed during thermal annealing.

In contrast to the layered sample, PL mapping of this implanted sample shows a homogeneous distribution of 946 nm emission, and ESR spin counting indicates a conversion efficiency from implanted $^{28}$Si to $SiV^0$ of higher than 80%.

The number of $SiV^0$ centers formed in the implanted sample was determined in a spin counting experiment using pulsed ESR. In this experiment the amplitude of the $SiV^0$ Hahn echo signal in the implanted sample was compared to the amplitude of the Hahn echo signal from a known reference sample. The reference sample was an isotopically enriched $^{28}$Si crystal doped with phosphorus. The number of phosphorus donor electron spins in this sample was known accurately from measurements of the instantaneous diffusion time. The two samples were measured under the same setup conditions including temperature and resonator Q-factor values. The interpulse delay, $\tau$, in the Hahn echo experiment was set much shorter than $T_2$ in both samples. To make a direct comparison, no optical spin polarization was induced in this measurement. Instead, the spins were allowed to reach Boltzmann equilibrium by using a long delay between repeated experiments (repetition time much longer than $T_1$). The echo strength then corresponds to the Boltzmann equilibrium spin polarization (4.8%) at 4.8 K and 9.7 GHz. Considering the difference between the number of sites, transitions, and hyperfine lines as well as the difference in the dipole strength between a spin-1 species and a spin-½ species we evaluated the total number of spins in the implanted sample. This measurement was performed in two separate runs, and the resulting conversion efficiency was estimated to be 90±10%.

This implanted sample exhibits markedly different behavior in time-resolved ESR compared to the layered sample. Both the electron spin coherence and relaxation times show single exponential behavior, indicating that the $SiV^0$ environment is homogeneous.

Referring back to FIG. 5A, below 20 K, the electron spin coherence time (520) measured using a Hahn echo sequence is $T_2$=0.954±0.025 ms and is independent of temperature. This spin coherence time is more than 4 orders of magnitude longer than the $T_2$=35 ns reported for $SiV^-$ at 4.5 K (L. J. Rogers et al., All-Optical Initialization, Readout, and Coherent Preparation of Single Silicon Vacancy Spins in Diamond. Phys. Rev. Lett. 113, 263602 (2014)). This $T_2$ is far below the limit given by the spin relaxation time (510), which was measured to be $T_1$=43±2 s.

Figure 5B:
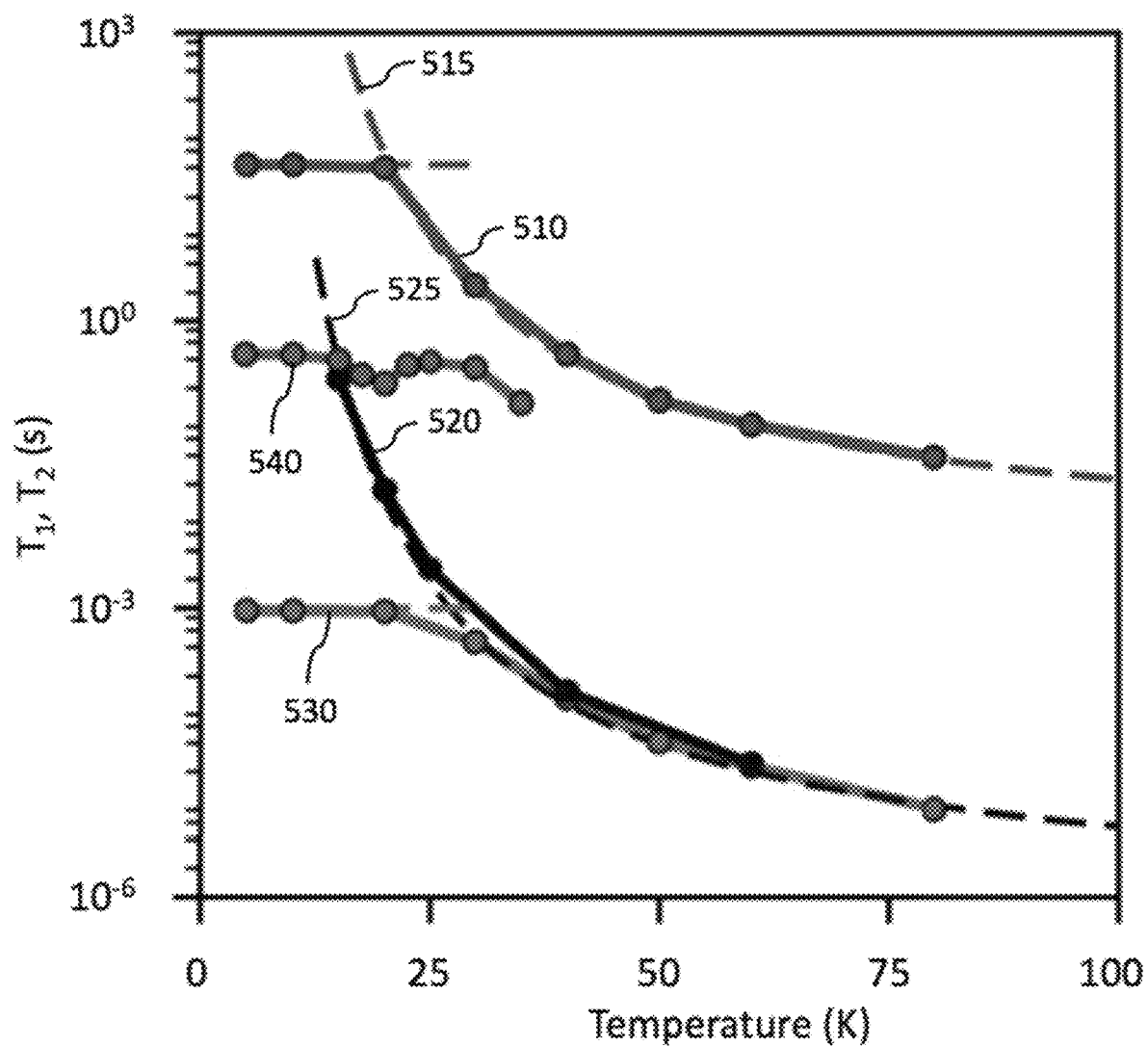
FIG. 5B is a graph illustrating Electron nuclear double resonance (ENDOR) measurements of the $^{29}$Si nuclear spin.

$SiV^0$ also contains an intrinsic longer-lived quantum memory in the form of the $^{29}$Si nuclear spin within the defect. Referring to FIG. 5B, the nuclear spin coherence (540) of the intrinsic $^{29}$Si nuclear spin (I=½) was measured in a separate sample that was isotopically enriched during CVD growth with 90% $^{29}$Si and a $SiV^0$ concentration of 340 ppb. Using electron nuclear double resonance at the $m_s$=0↔+1 transition was observed as $T_{2n}$=0.45±0.03 s, with a flat temperature dependence at low temperature (T<15 K). The nuclear spin coherence is limited by direct flip-flops between pairs of $SiV^0$ electron spins at this concentration, indicating that the nuclear spin coherence can be extended by decreasing the concentration of $SiV^0$.

The spin relaxation time is also independent of temperature in this range, similar to previous observations of $NV^-$ ensembles. The temperature-independent mechanism limiting $T_1$ at low temperatures remains unknown, but the direct (single phonon) relaxation process can be excluded because it would have a $T^{-1}$ dependence. The decoherence mechanism at low temperature can be inferred by the stretching factor, n, extracted from the Hahn echo decay signal S(t) by fitting the data to a stretched exponential, $S(t)=A\cdot\exp(-(t/T_2)^n)$. The stretching factor n=2 indicated that the coherence time is dominated by spectral diffusion from the 1.1% natural abundance of $^{13}$C nuclei in this sample, similar to what is observed for $NV^-$ centers. Other samples had less than the 1.1% natural abundance of $^{13}$C nuclei, preferably less than or equal to 1%, more preferably less than or equal to 0.5%, even more preferably less than or equal to 0.1%, and more preferably less than or equal to 0.01%, and still more preferably less than or equal to 0.001% of $^{13}$C nuclei. Dynamical decoupling with the Carr-Purcell-Meiboom-Gill (CPMG) sequence refocuses decoherence from $^{13}$C spectral diffusion, extending the coherence time to $T_{2,CPMG}$=255±20 ms at 15 K, limited by pulse error accumulation.

At temperatures above 20 K, both $T_1$ and $T_2$ rapidly decrease with increasing temperature. The temperature dependence of the spin relaxation is consistent with an Orbach process, $T_1 \propto \exp(-E_a/kT)$, with an activation energy $E_a$=16.8 meV. Both $T_2$ and $T_{2,CPMG}$ exhibit a similar temperature dependence to the spin relaxation but scaled by a constant factor of 4100, suggesting that the decay in $T_2$ with temperature is related to the same Orbach process.

The connection between the zero-phonon photoluminescence line at 946 nm and the KUL1 ESR center was verified by scanning a narrow linewidth laser around 946 nm while detecting the polarization induced on one of the $SiV^0$ electron spin transitions. The optical spectrum of the induced spin polarization was measured by orienting the crystal with B||⟨111⟩ and measuring the strength of the integrated Hahn echo signal from the $m_s$=0↔+1 transition of a site parallel to the magnetic field as well as for a site oriented at 109° relative to the magnetic field. The tunable laser was shuttered during the microwave sequence to avoid illumination-induced dephasing. The polarization generated by the laser took almost 30 seconds to saturate with 40 mW incident on the sample. The maximum polarization obtained was 38%, accomplished by exciting at 947 nm. The saturation curve for the 947 nm excitation shows a biexponential behavior; this is possibly due to the presence of two overlapping transitions at this excitation wavelength. A small amount of spin polarization can also be observed by exciting at 952 nm, where the PL spectrum shows a small peak. However, the polarization is about an order of magnitude smaller.

The high degree of optical spin polarization suggests that there are likely spin conserving and spin pumping optical transitions, which are key ingredients for quantum networks.

Figure 7:
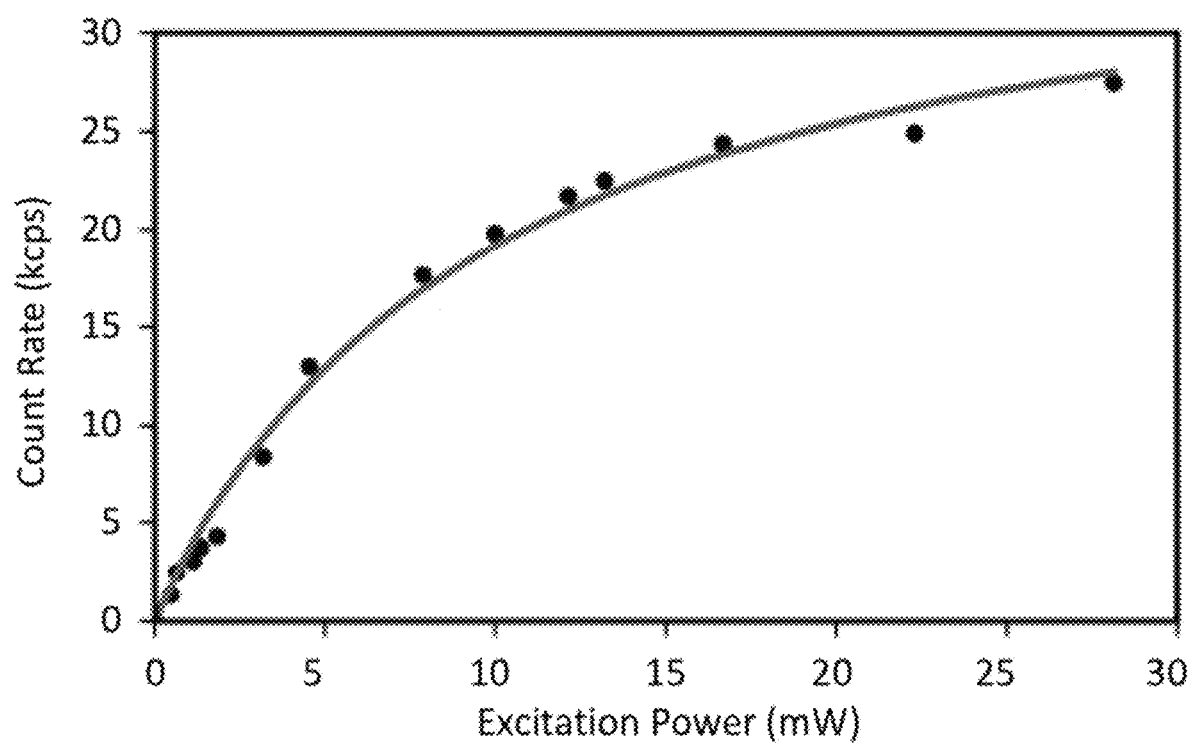
FIG. 7 is a graph illustrating a saturation curve of a single center exciting with a 905 nm continuous wave laser.

To optically examine single $SiV^0$ centers, silicon ions were implanted at a dose of $10^9$ cm$^{-2}$ into a lightly boron-doped diamond, followed by high-temperature annealing to form $SiV^0$. A confocal scan at 5 K with off-resonant excitation (905 nm, 28 mW) and detection at wavelengths longer than 930 Mil shows isolated and diffraction-limited PL spots with a peak intensity>10 kilocounts per second (kcounts/s). Second-order photon correlation statistics from an isolated spot show a clip at zero-time delay, $g^{(2)}(0)$=0.126±0.037, confirming that these spots arise from single-photon emitters. A power dependence of the PL intensity reveals that the saturated count rate is 37.5 kcounts/s (See FIG. 7). Taking the saturated photon count rate and accounting for the low quantum efficiency of the detector (22%), transmission through a beamsplitter (55%), and transmission through the high-numerical aperture and fiber-coupling objectives (74 and 85%, respectively) in this wavelength range, it was estimated that this corresponds to a photon emission rate of ~500,000 photons/s. Additionally, it was noted that bright emitters have a broader inhomogeneous distribution (>20 nm) than the bulk PL linewidth of <1 nm measured in the heavily implanted sample. This distribution in wavelength is most likely a result of surface-related strain and is consistent with recent measurements of SiV⁻ where inhomogeneous distributions of ~20 nm have been observed in nanodiamonds.

In contrast to bulk PL in the layered sample, the emission spectra of these single centers exhibit narrow, spectrometer-limited peaks (0.1 nm resolution) with no discernible phonon sideband. A lower bound on the Debye-Waller factor was estimated by comparing the intensity at the ZPL with the full bandwidth of the measurement, which includes background and noise. By integrating the measured emission out to 1000 nm and comparing to the integrated intensity at 946 nm, it was estimated that 90±10% of the emission is in the ZPL.

This is in contrast with previous estimates of the Debye-Waller factor of SiV⁰, which were complicated by the presence of uncontrolled co-defects in this wavelength range (U. F. S. D'Haenens-Johansson et al., Optical properties of the neutral silicon split-vacancy center in diamond. Phys. Rev. B 84, 1-14 (2011)).

The optical transitions of SiV⁰ were investigated in detail using bulk photoluminescence excitation (PLE) spectroscopy, in which a narrow linewidth laser (<200 kHz) is scanned across the SiV⁰ ZPL while measuring emission in the phonon sideband. Although a phonon sideband was not observed in the PL spectrum using off-resonant excitation, a small but measurable increase in photon counts was observed at wavelengths above 960 nm with resonant excitation at 946 nm. The scan resolved narrow lines with linewidths ranging from 250 to 500 MHz, which is a factor of 3-6 wider than the transform limited linewidth of 88 MHz determined by the bulk PL excited state lifetime of 1.8 ns. Repeated scans over a 3-hour period show that these lines are completely stable in frequency, showing no measurable sign of spectral diffusion. This is in stark contrast to observations of implanted NV⁻ centers, which exhibit optical linewidths 10-100 times their natural linewidth.

Various modifications and variations of the invention in addition to those shown and described herein will be apparent to those skilled in the art without departing from the scope and spirit of the invention and fall within the scope of the claims. Although the invention has been described in connection with specific preferred embodiments, it should be understood that the invention as claimed should not be unduly limited to such specific embodiments.

In addition, the references listed herein are also part of the application and are incorporated by reference in their entirety as if fully set forth herein.

What is claimed:

1. A composition of matter, comprising:
   carbon in a diamond lattice;
   a neutral silicon vacancy center (SiV⁰) in the diamond lattice;
   wherein the composition of matter displays a photoluminescence emission peak arising from the neutral silicon vacancy centers around 946 nm; and
   wherein a zero phonon line for the neutral silicon vacancy center has a full width half maximum intrinsic inhomogeneous zero phonon line width of no more than 500 MHz over a time scale of at least 1 ms at temperatures below 40 K.

2. The composition of matter of claim 1, wherein at least one neutral silicon vacancy center is no more than 1 micron from a surface of the composition of matter.

3. The composition of matter of claim 1, further comprising acceptor dopants in the diamond lattice at a concentration of less than or equal to 3 ppm.

4. The composition of matter of claim 1, further comprising a total concentration of silicon in the diamond lattice at a concentration of less than or equal to 1 ppm, wherein the ratio of neutral silicon vacancy centers to ²⁸Si is at least 4:1.

5. The composition of matter of claim 1, wherein a neutral silicon vacancy center has an optical linewidth between 1 and 20 times the transform limited linewidth determined by the bulk photoluminescence excited state lifetime limit.

6. The composition of matter of claim 1, wherein the neutral silicon vacancy center is configured to have a spin relaxation time of between 20 seconds and 500 seconds when below 20 K, the neutral silicon vacancy center is configured to have an electron spin coherence time of between 0.5 milliseconds and 1 second when below 20 K, a silicon isotope incorporated in the neutral silicon vacancy center is 29Si, the percentage of 13C in the diamond lattice is suppressed below natural abundance, or a combination thereof.

7. The composition of matter of claim 1, wherein the zero phonon line for a neutral silicon vacancy center has a full width half maximum intrinsic inhomogeneous zero phonon line width selected from any of the group consisting of no more than 250 MHz and no more than 100 MHz.

* * * * *